(12) United States Patent
Yanai et al.

(10) Patent No.: US 6,625,705 B2
(45) Date of Patent: Sep. 23, 2003

(54) REMOTE DATA MIRRORING SYSTEM HAVING A SERVICE PROCESSOR

(75) Inventors: Moshe Yanai, Brookline, MA (US); Natan Vishlitzky, Brookline, MA (US); Bruno Alterescu, Newton, MA (US); Daniel D. C. Castel, Boston, MA (US); Gadi G. Shklarsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/224,211

(22) Filed: Aug. 20, 2002

(65) Prior Publication Data

US 2002/0194442 A1 Dec. 19, 2002

Related U.S. Application Data

(60) Division of application No. 09/709,814, filed on Nov. 10, 2000, which is a division of application No. 09/061,708, filed on Apr. 17, 1998, now Pat. No. 6,173,377, which is a continuation of application No. 08/654,511, filed on May 28, 1996, now Pat. No. 5,742,792, which is a continuation-in-part of application No. 08/052,039, filed on Apr. 23, 1993, now Pat. No. 5,544,347.

(51) Int. Cl.$^7$ .............................. G06F 12/16; H02H 3/05

(52) U.S. Cl. ........................ 711/162; 711/161; 711/165; 714/5; 714/7

(58) Field of Search ................................ 711/154, 156, 711/161, 162, 165; 714/5, 6, 7, 718

(56) References Cited

U.S. PATENT DOCUMENTS

| 3,588,839 | A | 6/1971 | Belady et al. ............... 395/469 |
| 3,623,014 | A | 11/1971 | Doelz et al. ............. 340/172.5 |
| 3,771,137 | A | 11/1973 | Barner et al. ................ 340/172 |

(List continued on next page.)

FOREIGN PATENT DOCUMENTS

| EP | 167322 | * | 1/1986 | ............. G06F/1/00 |
| EP | 0239323 | | 9/1987 | ........... G06F/13/12 |
| EP | 0323123 | | 12/1988 | ........... G06F/11/00 |
| EP | 593062 | A2 * | 4/1994 | ........... G06F/11/00 |
| EP | 674263 | A1 * | 9/1995 | ........... G06F/11/20 |
| GB | 2086625 | | 5/1992 | |
| JP | 56-153460 | * | 11/1981 | ........... G06F/13/00 |
| JP | 57-111900 | | 7/1982 | ........... G06F/29/00 |
| JP | 62-89150 | * | 4/1987 | ........... G06F/12/06 |

(List continued on next page.)

OTHER PUBLICATIONS

"EMC Introduces Symmetrix 5500 Continuous Operation Disk Storage for Mission Critical IBM Mainframe Market," News from EMC Corporation, Hopkinton, Mass., Nov. 10, 1992, 3 pages.

Yanai et al., Ser. 10/224,195, filed Aug. 20, 2002, filed Aug. 20, 2002, entitled "Remote Data Mirroring System Having a Remote Link Adapter";.

(List continued on next page.)

*Primary Examiner*—Tuan V. Thai
(74) *Attorney, Agent, or Firm*—Howrey Simon Arnold & White

(57) ABSTRACT

A primary data storage system is linked to a geographically remote secondary data storage system for automatically maintaining a remote copy of the data in the primary storage. Each of the data storage systems has at least one data storage device, a cache memory, a data storage system controller, and a service processor for servicing the data storage system. The primary and secondary service processors are linked to permit remote system configuration and remote software programming of the secondary data storage system, and to exchange a report of all the non-valid, out of sync tracks. The service processors can also perform the task of scanning for remote write pending bits to invoke the remote copy task, and checking for invalid track bits to invoke a task for copying data from a known good storage device to the device with the invalid track bit set.

35 Claims, 3 Drawing Sheets

U.S. PATENT DOCUMENTS

| | | |
|---|---|---|
| 3,835,260 A | 9/1974 | Prescher et al. ............. 379/237 |
| 3,866,182 A | 2/1975 | Yamada et al. ............. 340/172 |
| 3,936,806 A | 2/1976 | Batcher ...................... 395/800 |
| 4,020,466 A | 4/1977 | Cordi et al. ................. 395/600 |
| 4,057,849 A | 11/1977 | Ying et al. .................. 345/193 |
| 4,084,231 A | 4/1978 | Capozzi et al. ............. 395/444 |
| 4,094,000 A | 6/1978 | Brudevold .................. 345/200 |
| 4,124,843 A | 11/1978 | Bramson et al. ............ 340/337 |
| 4,150,429 A | 4/1979 | Ying ........................... 395/293 |
| 4,161,777 A | 7/1979 | Behnase et al. ............. 395/481 |
| 4,193,113 A | 3/1980 | Crkowski ................... 395/375 |
| 4,204,251 A | 5/1980 | Brudevold .................. 395/309 |
| 4,249,802 A | 2/1981 | Muchel et al. .............. 351/206 |
| 4,342,079 A | 7/1982 | Stewart et al. .............. 395/405 |
| 4,361,855 A | 11/1982 | Igarashi ........................ 360/39 |
| 4,368,532 A | 1/1983 | Imazeki et al. ............. 371/21.5 |
| 4,384,274 A | 5/1983 | Mao ............................ 341/135 |
| 4,396,984 A | 8/1983 | Videki, II ................... 395/858 |
| 4,430,727 A | 2/1984 | Moore et al. ............... 395/442 |
| 4,453,215 A | 6/1984 | Reid ........................... 395/182 |
| 4,464,713 A | 8/1984 | Benhase et al. ............. 395/415 |
| 4,523,206 A | 6/1985 | Sasscer ....................... 395/457 |
| 4,523,275 A | 6/1985 | Swenson et al. ........ 395/182.05 |
| 4,530,055 A | 7/1985 | Hamstra et al. ............. 395/463 |
| 4,577,272 A | 3/1986 | Ballew et al. ............... 395/650 |
| 4,594,577 A | 6/1986 | Mao ............................ 341/135 |
| 4,598,357 A | 7/1986 | Swenson et al. ............ 395/440 |
| 4,608,688 A | 8/1986 | Hanson et al. ................ 371/11 |
| 4,618,827 A | 10/1986 | Redington et al. .......... 324/309 |
| 4,634,100 A | 1/1987 | Julich et al. ................... 371/11 |
| 4,638,424 A | 1/1987 | Beglin et al. ................ 364/200 |
| 4,686,620 A | 8/1987 | Ng ............................... 364/200 |
| 4,698,808 A | 10/1987 | Ishii ............................... 371/21 |
| 4,707,783 A | 11/1987 | Lee et al. .................... 395/375 |
| 4,710,870 A | 12/1987 | Blackwell et al. .......... 395/182 |
| 4,726,024 A | 2/1988 | Guziak et al. ........... 395/182.22 |
| 4,727,544 A | 2/1988 | Brunner et al. ............. 371/21.2 |
| 4,736,407 A | 4/1988 | Dumas .......................... 379/96 |
| 4,751,578 A | 6/1988 | Reiter et al. ................. 348/564 |
| 4,755,928 A | 7/1988 | Johnson et al. ............. 395/182 |
| 4,769,764 A | 9/1988 | Levanon ..................... 361/680 |
| 4,771,375 A | 9/1988 | Beglin et al. ................ 364/200 |
| 4,773,035 A | 9/1988 | Lee et al. .................... 364/748 |
| 4,779,189 A | 10/1988 | Legvold et al. ............. 395/493 |
| 4,782,486 A | 11/1988 | Lipcon et al. ............. 371/21.5 |
| 4,783,834 A | 11/1988 | Anderson et al. ........... 382/245 |
| 4,785,472 A | 11/1988 | Shapiro ........................ 379/96 |
| 4,797,750 A | 1/1989 | Karweit ....................... 358/335 |
| 4,805,106 A | 2/1989 | Pfeifer ......................... 395/650 |
| 4,807,186 A | 2/1989 | Ohnishi et al. .............. 395/800 |
| 4,814,592 A | 3/1989 | Bradt et al. .................. 235/284 |
| 4,823,333 A | 4/1989 | Satoh et al. ................... 369/84 |
| 4,831,558 A | 5/1989 | Shoup et al. ................ 364/550 |
| 4,837,680 A | 6/1989 | Crockett et al. ............. 395/284 |
| 4,841,475 A | 6/1989 | Ishizuka ...................... 395/849 |
| 4,849,978 A | 7/1989 | Dishon et al. ............... 395/182 |
| 4,862,411 A | 8/1989 | Dishon et al. ............... 395/494 |
| 4,866,611 A | 9/1989 | Cree et al. ................... 364/300 |
| 4,879,718 A | 11/1989 | Sanner ....................... 371/22.3 |
| 4,916,605 A | 4/1990 | Beardsley et al. ........... 395/489 |
| 4,949,187 A | 8/1990 | Cohen ......................... 358/335 |
| 4,959,774 A | 9/1990 | Davis .......................... 364/200 |
| 4,960,031 A | 10/1990 | Farrand ........................ 84/609 |
| 4,974,156 A | 11/1990 | Harding et al. ............. 364/200 |
| 4,985,695 A | 1/1991 | Wilkinson et al. .......... 340/571 |
| 5,003,382 A | 3/1991 | Omi et al. ................... 358/537 |
| 5,007,053 A | 4/1991 | Iyer et al. ...................... 371/21 |
| 5,016,876 A | 5/1991 | Loffredo ..................... 273/437 |
| 5,029,199 A | 7/1991 | Jones et al. ................... 379/89 |
| 5,051,887 A | 9/1991 | Berger et al. ............... 395/489 |
| 5,060,142 A | 10/1991 | Menon et al. ............... 395/825 |
| 5,060,185 A | 10/1991 | Naito et al. .................. 395/600 |
| 5,072,368 A | 12/1991 | Foreman et al. ........ 395/182.04 |
| 5,083,271 A | 1/1992 | Thacher et al. ............. 364/441 |
| 5,087,968 A | 2/1992 | Omi et al. ................... 358/515 |
| 5,088,021 A | 2/1992 | McLaughlin et al. ....... 364/187 |
| 5,089,958 A | 2/1992 | Horton et al. ............... 395/185 |
| 5,093,787 A | 3/1992 | Simmons ..................... 364/406 |
| 5,097,439 A | 3/1992 | Patriquin et al. ........... 395/402 |
| 5,099,485 A | 3/1992 | Bruckert et al. ............ 395/182 |
| 5,101,492 A | 3/1992 | Schultz et al. .............. 395/575 |
| 5,109,492 A | 4/1992 | Noguchi et al. ............. 395/325 |
| 5,123,099 A | 6/1992 | Shibata et al. ............... 395/447 |
| 5,127,048 A | 6/1992 | Press et al. .................. 379/100 |
| 5,132,787 A | 7/1992 | Omi et al. ................... 358/524 |
| 5,134,711 A | 7/1992 | Asthana et al. ............. 395/800 |
| 5,140,592 A | 8/1992 | Idleman et al. ......... 395/182.05 |
| 5,146,576 A | 9/1992 | Beardsley et al. ........... 395/440 |
| 5,146,605 A | 9/1992 | Beukema et al. ........... 395/821 |
| 5,155,814 A | 10/1992 | Beardsley et al. ........... 395/872 |
| 5,155,835 A | 10/1992 | Belsan ........................ 395/441 |
| 5,155,845 A | 10/1992 | Beal et al. |
| 5,157,663 A | 10/1992 | Major et al. .................. 371/9.1 |
| 5,157,770 A | 10/1992 | Beardsley et al. ........... 395/439 |
| 5,159,671 A | 10/1992 | Iwami ......................... 395/250 |
| 5,170,471 A | 12/1992 | Bonevento et al. ......... 395/837 |
| 5,170,480 A | 12/1992 | Mohan et al. ............... 395/600 |
| 5,175,837 A | 12/1992 | Arnold et al. ............... 395/425 |
| 5,175,839 A | 12/1992 | Ikeda et al. .................. 395/410 |
| 5,185,864 A | 2/1993 | Bonevento et al. ......... 395/868 |
| 5,185,884 A | 2/1993 | Martin et al. ............... 395/575 |
| 5,201,053 A | 4/1993 | Benhase et al. ............. 395/289 |
| 5,202,887 A | 4/1993 | Ueno et al. .................... 371/10 |
| 5,206,939 A | 4/1993 | Yanai et al. |
| 5,210,865 A | 5/1993 | Davis et al. ................. 395/575 |
| 5,212,772 A | 5/1993 | Masters ....................... 395/200 |
| 5,212,784 A | 5/1993 | Sparks ......................... 395/575 |
| 5,235,601 A | 8/1993 | Stallmo et al. ................ 371/40 |
| 5,235,687 A | 8/1993 | Bacot et al. ................. 395/425 |
| 5,235,690 A | 8/1993 | Beardsley et al. ........... 395/440 |
| 5,235,692 A | 8/1993 | Ayres et al. ................. 395/849 |
| 5,239,637 A | 8/1993 | Davis et al. ................. 395/425 |
| 5,239,659 A | 8/1993 | Rudeseal et al. ............. 95/800 |
| 5,257,144 A | 10/1993 | Curasi et al. .................. 360/51 |
| 5,263,154 A | 11/1993 | Eastridge et al. ............ 395/575 |
| 5,269,011 A | 12/1993 | Yanai et al. |
| 5,274,645 A | 12/1993 | Idelman et al. ............. 395/182 |
| 5,276,867 A | 1/1994 | Kenley et al. ............... 395/600 |
| 5,276,871 A | 1/1994 | Howarth ..................... 395/600 |
| 5,285,451 A | 2/1994 | Henson et al. ................ 371/11 |
| 5,307,481 A | 4/1994 | Shimazaki et al. .......... 395/575 |
| 5,313,664 A | 5/1994 | Sugiyama et al. .......... 364/405 |
| 5,317,731 A | 5/1994 | Dias et al. ................... 395/600 |
| 5,321,826 A | 6/1994 | Ushiro ........................ 395/425 |
| 5,335,352 A | 8/1994 | Yanai et al. |
| 5,341,493 A | 8/1994 | Yanai et al. |
| 5,343,477 A | 8/1994 | Yamada ...................... 395/182 |
| 5,357,509 A | 10/1994 | Ohizumi ....................... 371/10 |
| 5,367,698 A | 11/1994 | Webber et al. .............. 395/800 |
| 5,375,232 A | 12/1994 | Legvold et al. ............. 395/575 |
| 5,377,342 A | 12/1994 | Sakai et al. .................. 395/425 |
| 5,379,412 A | 1/1995 | Eastridge et al. ............ 395/575 |
| 5,381,539 A | 1/1995 | Yanai et al. ................. 395/425 |
| 5,392,390 A | 2/1995 | Crozier ....................... 395/161 |
| 5,404,500 A | 4/1995 | Legvold et al. ............. 395/575 |
| 5,404,508 A | 4/1995 | Konrad et al. .............. 395/600 |
| 5,410,667 A * | 4/1995 | Belsan et al. ................ 711/114 |
| 5,412,668 A * | 5/1995 | Dewey ........................ 714/766 |
| 5,428,796 A | 6/1995 | Iskiyan et al. ............... 395/728 |
| 5,432,922 A | 7/1995 | Polyzois et al. ............. 395/425 |
| 5,434,994 A | 7/1995 | Shaheen et al. ............. 395/500 |

| | | | |
|---|---|---|---|
| 5,435,004 A | 7/1995 | Cox et al. ................... | 395/575 |
| 5,437,022 A | 7/1995 | Beardsley et al. .......... | 395/575 |
| 5,440,727 A | 8/1995 | Bhide et al. ................ | 395/444 |
| 5,446,872 A | 8/1995 | Ayres et al. ................ | 395/180 |
| 5,450,577 A | 9/1995 | Lai et al. .................... | 395/182 |
| 5,459,857 A | 10/1995 | Ludlam et al. | |
| 5,463,752 A | 10/1995 | Behnase et al. ............ | 395/481 |
| 5,469,503 A | 11/1995 | Butensky et al. ........... | 379/265 |
| 5,473,776 A | 12/1995 | Nosaki et al. .............. | 395/700 |
| 5,479,654 A | 12/1995 | Squibb ....................... | 395/600 |
| 5,495,601 A | 2/1996 | Narang et al. .............. | 395/600 |
| 5,495,606 A | 2/1996 | Borden et al. .............. | 395/600 |
| 5,497,483 A | 3/1996 | Beardsley et al. .......... | 395/575 |
| 5,502,811 A * | 3/1996 | Ripberger .................... | 714/6 |
| 5,504,888 A | 4/1996 | Iwamoto et al. ............ | 395/600 |
| 5,506,986 A | 4/1996 | Healy ......................... | 395/600 |
| 5,522,031 A | 5/1996 | Ellis et al. ................... | 395/182 |
| 5,526,484 A | 6/1996 | Casper et al. ............... | 395/200 |
| 5,535,381 A | 7/1996 | Kopper ....................... | 395/600 |
| 5,537,533 A | 7/1996 | Staheli et al. ............... | 395/182 |
| 5,537,585 A | 7/1996 | Blickenstaff et al. ....... | 395/600 |
| 5,544,345 A | 8/1996 | Carpenter et al. .......... | 395/477 |
| 5,544,347 A | 8/1996 | Yanai et al. ................ | 395/489 |
| 5,555,371 A | 9/1996 | Duyanovich et al. ....... | 395/182 |
| 5,574,950 A | 11/1996 | Hathorn et al. ............. | 395/828 |
| 5,579,318 A | 11/1996 | Reuss et al. .................. | 370/94 |
| 5,584,039 A | 12/1996 | Johnson et al. ............. | 395/826 |
| 5,592,618 A | 1/1997 | Micka et al. ............... | 395/185 |
| 5,592,660 A | 1/1997 | Yokota et al. .............. | 395/600 |
| 5,596,706 A | 1/1997 | Shimazaki et al. ......... | 395/182 |
| 5,613,106 A | 3/1997 | Thurman et al. ........... | 395/620 |
| 5,613,155 A | 3/1997 | Baldiga et al. ............. | 395/825 |
| 5,615,329 A | 3/1997 | Kern et al. .................. | 395/182 |
| 5,615,364 A | 3/1997 | Marks ......................... | 395/618 |
| 5,625,818 A | 4/1997 | Zarmer et al. .............. | 395/615 |
| 5,633,999 A | 5/1997 | Clowes et al. .............. | 395/182 |
| 5,649,089 A | 7/1997 | Kilner ........................ | 395/182 |
| 5,649,152 A | 7/1997 | Ohran et al. ................ | 395/441 |
| 5,673,382 A | 9/1997 | Cannon et al. ............. | 395/182 |
| 5,680,580 A | 10/1997 | Beardsley et al. .......... | 395/489 |
| 5,680,640 A | 10/1997 | Ofek et al. .................. | 395/839 |
| 5,682,396 A | 10/1997 | Yamamoto et al. ........... | 371/51 |
| 5,682,513 A | 10/1997 | Candelaria et al. ......... | 395/440 |
| 5,689,732 A | 11/1997 | Kondo ....................... | 395/884 |
| 5,692,155 A | 11/1997 | Iskiyan et al. .............. | 395/489 |
| 5,701,429 A | 12/1997 | Legvold et al. ............. | 395/441 |
| 5,721,916 A | 2/1998 | Pardikar .................... | 395/617 |
| 5,724,500 A | 3/1998 | Shinmura et al. ........... | 395/182 |
| 5,734,813 A | 3/1998 | Yamamoto et al. ......... | 395/182 |
| 5,740,397 A | 4/1998 | Levy .......................... | 395/441 |
| 5,742,792 A | 4/1998 | Yanai et al. ................ | 395/489 |
| 5,758,149 A | 5/1998 | Bierma et al. .............. | 395/608 |
| 5,764,972 A | 6/1998 | Crouse et al. ............... | 395/601 |
| 5,819,310 A | 10/1998 | Vishlitzky et al. .......... | 711/114 |
| 5,835,954 A | 11/1998 | Duyanovich et al. ....... | 711/162 |
| 5,845,295 A | 12/1998 | Houseman et al. ......... | 707/204 |
| 5,852,715 A | 12/1998 | Raz et al. .............. | 395/200.31 |
| 5,889,935 A | 3/1999 | Ofek et al. .................. | 395/182 |
| 5,901,327 A * | 5/1999 | Ofek ......................... | 711/100 |
| 5,909,483 A | 6/1999 | Weare et al. ............ | 379/88.18 |
| 4,958,270 A | 9/1999 | McLaughlin et al. ....... | 364/187 |
| 5,978,565 A | 11/1999 | Ohran et al. ........... | 395/182.11 |
| 5,987,566 A | 11/1999 | Vishlitzky et al. .......... | 711/114 |
| 6,035,412 A | 3/2000 | Tamer et al. .................. | 714/6 |
| 6,052,797 A | 4/2000 | Ofek et al. .................... | 714/6 |
| 6,044,444 A | 5/2000 | Ofek et al. ................. | 395/825 |
| 6,092,066 A | 7/2000 | Ofek ........................... | 707/10 |
| 6,101,497 A | 8/2000 | Ofek ........................... | 707/10 |
| 6,108,748 A | 8/2000 | Ofek et al. ................. | 711/112 |
| 6,484,187 B1 * | 11/2002 | Kern et al. ................. | 707/204 |
| 6,502,205 B1 | 12/2002 | Yanai et al. .................... | 714/7 |

FOREIGN PATENT DOCUMENTS

| | | | | |
|---|---|---|---|---|
| JP | 62-274448 | * | 11/1987 | .......... G06F/13/10 |
| JP | 63-278155 | * | 11/1988 | .......... G06F/12/00 |
| JP | 1-19437 | * | 1/1989 | .......... G06F/11/01 |
| JP | 1-19438 | * | 1/1989 | .......... G06F/11/20 |
| JP | 1-120652 | * | 5/1989 | .......... G06F/13/00 |
| JP | 2-32418 | * | 2/1990 | ............ G06F/3/06 |
| JP | 2-32419 | * | 2/1990 | ............ G06F/3/06 |
| JP | 2-32420 | * | 2/1990 | ............ G06F/3/08 |
| JP | 2-35537 | * | 2/1990 | .......... G06F/12/00 |
| JP | 2-37418 | * | 2/1990 | ............ G06F/3/06 |
| JP | 2-91716 | * | 3/1990 | ............ G06F/3/06 |
| JP | 2-91717 | * | 3/1990 | ............ G06F/3/06 |
| JP | 3-40121 | * | 2/1991 | ............ G06F/3/06 |
| JP | 3-92942 | * | 9/1991 | .......... G06F/12/00 |
| JP | 3-93942 U | | 9/1991 | ............ G06F/3/06 |
| JP | 3-250257 | * | 11/1991 | .......... G06F/15/40 |
| JP | 3-256143 | * | 11/1991 | .......... G06F/12/00 |
| JP | 3-256144 | * | 11/1991 | .......... G06F/12/00 |
| JP | 3-256146 | | 11/1991 | .......... G06F/12/00 |
| JP | 5-158631 | | 6/1993 | ............ G06F/3/06 |
| JP | 5-233162 | | 9/1993 | ............ G06F/3/06 |
| JP | 6-175788 | | 6/1994 | ............ G06F/3/06 |
| JP | 7-73078 | | 3/1995 | .......... G06F/12/00 |
| JP | 7-191811 | | 7/1995 | ............ G06F/3/06 |
| JP | 672985 A1 | * | 9/1995 | .......... G06F/11/14 |
| JP | 7-239799 | | 9/1995 | .......... G06F/11/20 |
| WO | WO94/00816 | | 1/1994 | |
| WO | WO94/25919 | | 11/1994 | |
| WO | WO 85/02926 | * | 7/1995 | .......... G06F/11/00 |
| WO | WO 95/23376 | | 8/1995 | .......... G06F/12/08 |
| WO | WO 94/00816 | * | 1/1999 | .......... G06F/13/00 |

OTHER PUBLICATIONS

Yanai et al., Ser. 10/224,138 filed Aug. 20, 2002, filed Aug. 20, 2002, entitled "Remote Data Mirroring System Local and Remote Write Pending Indicators"; and.

Yanai et al., Ser. 10/330,715 filed Dec. 27, 2002, entitled "Remote Data Mirroring".

D. L. Burkes & R.K. Treiber, "Design Approaches for Real–Time Transaction Processing Remote Site Recovery," Computer Society International Conference (COMPCON), Spring Meeting, Los Alamitos, Feb. 26–Mar. 2, 1990, No. CONF. 35, Feb. 23, 1990, Institute of Electrical and Electronics Engineers, New York, N.Y., pp. 568–572.

Supplementary European Search Report for EP 94 91 4223, Jul. 1, 1997. International Search Report for PCT/US/94/04326, Jul. 20, 1994.

International Search Report for PCT/US94/04326, Jul. 20, 1994.

PCT Written Opinion for PCT/US94/04326, Feb. 28, 1995.

PCT International Preliminary Examination Report for PCT/US94/04326, Jul. 18, 1995.

SFT Netware 286 Maintenance, #100–313–001, 100/Rev1.00, Novel Incorporated, Provo, Utah, Nov. 1987.

SFT Netware 286 Installation, #100–312–001, 100/Rev1 1.00, Novel Incorporated, Provo, Utah, Nov. 1987.

SFT Netware 286 Installation Supplement, #100–000225–001, 26/Rev1.02, Novel Incorporated, Provo, Utah, Jun. 1986.

SFT Netware 68 Maintenance, #100–000289–001, 64/Rev1.00, Novel Incorporated, Provo, Utah, Nov. 1986.

SFT Netware 68 Installation, #100–000317–001, 103/Rev1.00, Novel Incorporated, Provo, Utah, Feb. 1988.

SFT Netware 868 Installation Supplement, #100–000286–001, 61/Rev1.00, Novel Incorporated, Provo, Utah, Dec. 1986.

Hank Cote—New Horizons in Accessing Large Amounts of On–Line Data, pp. 71–75, 1982.

Matt Kramer—Fault-Tolerant LANs Guard Against Malfunction, Data Loss, pp. C26–C35, Sep. 1987.

Carol Grossman—Planning for 3990 Extended Functions, pp. 245–258, 1989, 30th Annual Guide Conference.

Bob Buchanan—Administrative Error Causes Most Major System Failures (3 pgs.), Feb. 1988, Government Computer News, V. 17, N. 4, p. 340.

Virginia Dudek—Planning for Network Disasters (4 pgs.), Jun. 12, 1989, MIS Week, vol. 10, N. 24.

Jen Bozman—Escon An Aid To Remote Disks (3 pgs.), V. 25, N. 1, p. 29, Jan. 7, 1991.

Gary A. Boles—A Raid Stack: Micropolis Raidion, Network Computer, Jun. 1992.

Blaine Homer—Raid Level 5 Protects Your Data With Interleaved Parity, LAN Times, May 25, 1992, vol. 9.

Michael Caton—Micropolis Array Secures Data, PC Week, 1992.

RAIDON Fault–Tolerant Disk Arrays Secures Brochure, 1993.

Storagetek 2Q Earnings Down, Iceberg Ready for Testing by Jim Mallory, Newsbytes, Jul. 15, 1993.

Network Backup Evolves, by Michael Peterson et al., PC Magazine, vol. 12, No. 16, Sep. 28, 1993, p. 277(18).

Your Next LAN Storage Could Be a Mainframe, Jeff Moad, Datamination vol. 39, No. 6, Mar. 15, 1993, p. 71.

Heard Any Good Rumors Lately? (Network Management), By Jill Huntington–Lee, LAN Computing, vol. 5, No. 5, Feb. 1994, p. 22.

Special Report: The AT&T Worldwide Intelligent Network—Scope, Nature and Management, Edge, vol. 7, No. 224, Nov. 6, 1992, p.9.

Software Extends Unix Distributed Computing, by Evan O. Grossman, PC Week, Jun. 5, 1989, p. 35 and p. 40.

IBM Funds Pack Firm, Electronic News, May 22, 1989, pp. 12.

IBM Plans U.S. Test of File–Transfer, Network World, Sep. 5, 1988, pp.15, 17.

IBM Invests In Firm That Offers Unix File–Sharing, Network World, May 22, 1989, p. 4.

IBM Plans Speedy Nationwide File System, Computer Systems News, Sep. 5, 1988, p. 56.

Design Alternatives for Disk Duplexing, by Spencer W. Ng. IBM Research Report, Jan. 30, 1987.

Disk Arm Movement In Anticipation of Future Requests, by Richard P. King, IBM Research Report, Dec. 16, 1987.

Ubik: Replicated Servers Made Easy, by Michael Leon Kazar, pp. 60–67, 1989.

Carnegie–Mellon Forges Standard Look For Multivendor Net, Computerworld, Jan. 30, 1989, pp. 37–42.

A Multi–Media Message System for Andrew, USENIX Winter Conference, Feb. 9–12, 1988, pp. 37–42.

Synchronization and Caching Issues in the Andrew File System, USENIX Winter Conference, Feb. 9–12, 1988, pp. 27–36.

Comparative Study of Some UNIX Distributed File Systems, EUUG, Sep. 22–24, 1986, pp. 73–82.

Volumes—The Andrew File System Data Structuring Primitive, EUUG Autumn 1986, Sep. 22–24, 1986, pp. 473–480.

Unix Plays Role in Corporate Networking, MIS Week, vol. 10, No. 28, Jul. 17, 1989, pp. 22–23.

Sun's Open System Made by Marketplace, "Unlike Minis, Unix Machines, Pcs and Even VMS Can be Glued" by NFS, Software Magazine, vol. 9, No. 12, Oct. 1989, pp. 72–75, Cashin, Jerry.

Protect Your Data! (Database Report), by Michael Liczbanski, Data Based Advisor, vol. 10, No. 5, May 1992, p. 114.

Network Planning to the Rescue; Network Managers Should Design and Test a Network Recovery Plan That Lets Business Continue Uninterrupted Even if Disaster Strikes, by Raymond W. Rudnitskas et al., Networking Management, vol. 9, No. 11, Oct. 1991, p. 46.

If LANS Eye Host Status, Quality Today Falls Short, by Barbara Bochenski, Software Magazine, vol. 11, No. 12, Oct. 1991, p. 66.

Safe and Secure, by Peter Stephenson, LAN Magazine, vol. 6, No. 9, Sep. 1991, p. 34.

Firing Up Fault Tolerance by Brian O'Connell, DEC Professional, vol. 10, No. 6, Jun, 1991, p. 118.

A Which Computer? Guide to Backup Systems, by Chris Bidmead, Which Computer?, Sep. 1989, p. 62.

Optical Disks Compete With Videotape and Magnetic Storage Media, by Henry Urrows et al., Optical Information Systems, vol. 8, No. 3, May–Jun. 1988, p. 101.

Preventing Disasters: Whipping Up an Emergency Response Plan, Network Computing, Feb. 1992, p. 81.

Abbey Banking on FDDI, Communications Week International, Mar. 4, 1991, p. 22.

X.25 Data Networks and IBM: A Troublesome Connection, by Jan Johnson, Computer Decisions, vol. 19, Jan. 12, 1987, p. 16.

DSC Communications Corp. Debuts NEXOS LAN Product Line at Interface, Demos Enhanced Performance, Fault Tolerance and WAN Connectivity, News Release, Mar. 28, 1988.

Analysis of Scanning Policies For Reducing Disk Seek Times, by E. G. Coffman, L. A. Klimko and Barbara Ryan–Siam, Journal on Computing, Sep. 1972, vol. 1, No. 3, pp. 269–280.

Configuring Tandem Disk Subsystems, by Scott Sitler, Tandem Systems Review, Dec. 1986, pp. 80–91.

Technical Report Investigation of Selected Disk Systems, Oct. 1976, Teledyne Brown Engineering, Huntsville, Alabama (18 pages).

Universal Server Under Development, MacWEEK, vol. 3, No. 39, Oct. 31, 1989, p. 5.

Unix Plays Role In Corporate Networking–Vendors Look Unix–Based Network Managment Tools as Networking Standards Slowly Evolve, MIS Week, Jul. 17, 1989, pp. 22–23, vol. 10, No. 28.

The 28 Runners Declared for Open Software Foundations, Distributed Computing Stakes, Computergram International, No. 1301, CGI11909912, Nov. 9, 1989.

Some Platforms (Theory of Self–Organizing Systems), Release 1.0, vol. 89, No. 6, Jun. 27, 1989, pp. 12–16.

Self–Organizing Systems (Overview of Detailed Examples of Self–Organizing Systems, Includes related article About the Importance of Self–Organizing Systems), Release 1.0, vol. 89, No. 6, Jun. 27, 1989, pp. 1–9.

IBM–Funded Startup Developing Unix Add–On, PC Week, vol. 6, No. 22, Jun. 5, 1989, p. 40.

Uniting File Systems; Experimental Large Scale, Distributed File Systems Are Now Being Created (included related article on the History of the AFS Project), UNIX Review, vol. 7, No. 3, Mar. 1989, pp. 61–70.

IBM Backs Transarc, Formed to Offer Andrew File System Distributed Unix Database, Computergram International, No. 1180, CGI05190001, May 19, 1989.

A Comparative Analysis of Disk Scheduling Policies, by Toby J. Reorey and Tad B. Pinerton, Communications of the ACM, Mar. 1972, vol. 15, No. 3, pp. 177–184.

Disk Scheduling: FCFS vs. SSTF Revisited, by Micha Hofri, Communications of the ACM, Nov. 1980, vol. 23, No. 11, pp. 645–653.

Using Multiple Replica Classes to Improve Performance in Distributed System, by Peter Triantafillou and David Tayloer, The 11th International Conference on Distributed Computing Systems, May 20–24, 1991, pp. 420–428.

Government Computer News, Oct. 9, 1987, Richard A. Damca, *Microcomputing* "Patch Fault Tolerance: A Strong Second Team," vol. 7, Issue 149 P27(2), Dec. 17, 1990.

Computer Reseller, Feb. 19, 1990, Joel Shore, *Mirrored Servers' a reality*, pp. 51, 52, 62.

Infoworld Articles, Mar. 12, 1990, *Vendors Offer Mirroring Solutions* P(31).

Wilkinson, *Compact and Novell team for fault tolerance: mirrored servers to cut down on costly downtime*, Article MIS Week, vol. 11, Issue 7, Feb. 12, 1990.

Article PC Week, vol. 4, Issue 37, Sep. 15, 1987, Matt Kramer, *Fault–Tolerant LANS Guard Against Malfunction, Data Loss*.

"DASD Time Bomb," Datamation, vol. 32, Mar. 1, 1986, P63(4), Alper, Alan.

Symmetrix Remote Data Facility (SRDF) Product Guide, P/N 200–999–554 Rev A, EMC Corporation, Hopkinton, Mass., Sep. 1994, 105 pp. [EMCP 00003686–3791].

"Symmetrix Remote Data Facility Data Sheet, Symmetrix–resident Software Feature to extend mirroring capabilities," EMC Corporation, Hopkinton, Mass., Apr. 1995, 4 pages [EMCP 000010741–1074].

"When Data is Lost in Minutes, its an Act of God. When Data is Recovered in Minutes, its an Act of EMC." EMC Corporation, Hopkinton, Mass., 1994, one page [EMCP 00003903].

"EMC Ships Mainframe Disaster Recovery Solution that Restores Data in Minutes," News from EMC Corporation, EMC Corporation, Hopkinton, Mass., Oct. 3, 1994, two pages [EMCP 00003921–3922].

"Asset Protection: Disk–Based Approach Makes Disaster Recovery More Efficient, Ensures Business Continuity," EMC Corporate Information, EMC Corporation, Hopkinton, Mass., 5 pages [EMCP 00003916–3920].

"EMC Ships Continuously–Available Disk–Based Disaster Recovery Solution," News from EMC Corporation, EMC Corporation, Hopkinton, Mass., Oct. 3, 1994, 4 pages [EMCP 00003923–8926].

"Symmetrix Remote Data Facility: Taking the disaster recovery," EMC Corporation, Hopkinton, Mass., Sep. 1994, 8 pages [EMCP 00003908–3915].

"Symmetrix Remote Data Facility:EMC redefines disaster recovery," Brochure, EMC Corporation, Hopkinton, Mass., Sep. 1994, 4 pages [EMCP 00003904–3907].

"EMC Introduces Symmetrix 5500 Continuous Operation Disk Storage for Mission Critical IBM Mainframe Market," News from EMC Corporation, Hopkinton, Mass., Nov. 10, 1992, 3 pages.

"MCI Deploys New Fast Data Transfer Technology from EMC," News from EMC Corporation, Hopkinton, Mass., May 22, 1995, 2 pages [EMCP 00007520–7521].

"EMC Agreement with Data Switch to Promote Long Distance Disaster Recovery," News from EMC Corporation, EMC Corporation, Hopkinton, Mass., Nov. 30, 1994, 2 pages [EMCP 00007516–7517].

"EMC and Comdisco to Benchmark Data Mirroring Capability," News from EMC Corporation, EMC Corporation, Hopkinton, Mass., Jan. 24, 1995, 2 pages [EMCP 00007518–7519].

"EMC Ships Mainframe Disaster Recovery Solution that Restores Data in Minutes," New from EMC Corporation, EMC Corporation, Hopkinton, Mass., Oct. 3, 1994, 2 pages [EMCP 00007514–7515].

N. S. Prasad, "IBM Mainframes: Architecture and Design," McGraw–Hill Book Company, New York, N. Y., 1989, pp. 58–73 and 182–196.

"The IBM 3390 Storage Control Reference," No. GA32–0099–04, International Business Machines Corporation, Tucson, Arizona, 1991, pp. 1–304.

Patterson et al., "A Case for Redundant Arrays of Inexpensive Disks (RAID), "Report No. UCB/CSD 87/391, Computer Science Division (EECS), University of California, Berkeley, California, Dec. 1987, pp. 1–24.

Patterson et al., "Introduction to Redundant Arrays of Inexpensive Disks (RAID), "COMPCON 89 Proceedings, Feb. 27–Mar. 3, 1989, IEEE Computer Society, pp. 112–117.

Patterson et al., "A Case for Redundant Arrays of Inexpensive Disks (RAID)," COMPCON 89 Proceedings, Feb. 27–Mar. 3, 1989, IEEE Computer Society, pp. 112–117.

Ousterhout et al., "Beating the I/O Bottleneck: A Case for Log–Structured File Systems," Operating Systems Review, vol. 23, No. 1, ACM Press, Jan., 1989, pp. 11–28.

Douglis et al., "Long Structured File Systems," Compcon 89 Proceedings, Feb. 27–Mar. 3, 1989, IEEE Computer Society, pp. 124–129.

Rosemblum et al., "The Design and Implementation of a Log–Structured File System," ACM Transactions on Computer Systems, vol. 1, Feb. 1992, pp. 26–52.

M. Morioka et al., "DESIGN AND EVALUATION OF THE HIGH PERFORMANCE MULTI–PROCESSOR SERVER," IEEE Transactions, pp. 66–69, 1994.

A. Reinefeld, "The MOL PROJECT: AN OPEN, EXTENSIBLE METACOMPUTER," IEEE Transactions, pp. 17–31, 1997.

Robert D. Sloan, "A PRACTICAL IMPLEMENTATION OF THE DATA BASE MACHINE—TERADATA DBC/1012," IEEE Transactions, pp. 320–327, 1992.

Nancy C. Ramsay, "INTEGRATION OF THE OPTICAL STORAGE PROCESSOR AND THE DBC/1012 DATA BASE COMPUTER," IEEE Transactions, pp. 94–97, 1990.

Jim Lyon, "TANDEM'S REMOTE DATA FACILITY," Tandem Computers, Inc., pp. 562–567, Jan. 1990.

Network backup –INPI Patent No. 93.12771, dated 21st Oct. 1993 "DISPOSITIF ET PROCEDE DE SAUVEGARDE A DISTANCE DE DONNEES NUMERIQUES," 15 pages.

"THE MIDGETS, THE MAMMOTH, AND THE MAINFRAMES," Business Week, Jun. 7, 1993, page 31.

Complaint —Civil Action No. 00–40188–NMG; EMC Corporation v. StorageApps, Inc., In the United States District Court, District of Massachusetts, Central Section, Oct. 20, 2000.

First Amended Complaint —Civil Action No. 00–40188–NMG; EMC Corporation v. Storage Apps, Inc., In the United States District Court, District of Massachusetts, Central Section, Nov. 9, 2000.

Answer, Counterclaim and Jury Demand of Defendant StorageApps, Inc. —Civil Action No. 00–40188–NMG; EMC Corporation v. StorageApps, Inc., In the United States District Court, District of Massachusetts, Central Section, Nov. 17, 2000.

Complaint of EMC Corporation Under Section 337 of the Tariff Act of 130, As Amended, United States International Trade Commission, In the Matter of Certain Data Storage Systems and Components Thereof, Investigation No. 337–TA–___, Apr. 11, 2002.

Complaint for Patent Infringement, In the United States District Court for the District of Massachusetts (Central Section), Civil Action No. BBO#546481, EMC Corporation v. Hitachi Data Systems Corporation and Hitachi, Ltd., Apr. 11, 2002.

Notice of Investigation, United States International Trade Commission, Inv. No. 337–TA–471, In the Matter of Certain Data Storage Systems and Components Thereof, May 9, 2002.

Notice of Investigation, United States International Trade Commision, Inv. No. 337–TA–471, In the Mater of Certain Data Storage Systems and Components Thereof, Federal Register, vol. 67, No. 93, Tuesday, May 14, 2002, pp. 34472–34473.

Fault Tolerance for LANs and Microcomputers, Atlantic Microsystems, Inc., Salem, NH, 1989 (7 pages).

IBM 3390 Storage Control Reference, Fifth Edition, Part No. GA32–0099–04, IBM Corporation, Sep. 1991.

Polyzois and Garcia Molina, "Evaluation of Remote Backup Algorithms for Transaction Processing Systems," 1992 ACM SIGMOD, pp. 246–255.

Polyzois and Garcia Molina, "Evaluation of Remote Backup Algorithms for Transaction Processing Systems," ACM Transactions on Database Systems, vol. 19, No. 3, Sep. 1994, pp. 423–449.

King and Halim, "Management of a Remote Backup Copy for Disaster Recovery," ACM Transactions on Database Systems, vol. 16, No. 2, Jun. 1991, pp. 338–368.

Lyon, J., "Tandem's Remote Data Facility," IEEE Comp $35^{th}$ Computer Society Meeting, Spring 1990, pp. 562–567, IEEE Computer Society Press, Los Alamitos, CA.

Bhide et al., "An Efficient Scheme for Providing High Availability," 1992 ACM SIGMOD, 1994, pp. 236–246 (also submitted is a four–page Portal.acm.org citation and abstract).

Gorelik et al., "Sybase Replication Server," International Conference on Management of Data and Symposium on Principles of Database Management 1994 SIGMOD, p. 469 (also submitted is a two–page portal.acm.org abstract).

Daniels, et al., "Shared Logging Services for Fault–Tolerant Distributed Computing," Proceedings of the Fourth Workshop on ACM SIGOPS European Workshop, 1990, pp. 1–4.

Ohtsuka, S. et al., "M2522/M2531 Optical Disk Library," Fujitsu–Scientific and Technical Journal, vol. 31, No. 1, Jun. 1995, p. 65–75.

Thanhardt, E., and Harano, G., "File Migration in the NCAR Mass Storage System," Digest of Papers $9^{th}$ IEEE Symposium on Mass Storage Systems (Editors, Friedman, K., and O'Lear, B.T.), 1988, Storage Systems: Perspectives, Nov. 1988, pp. 114–121 (also submitted is a one–page ieeexplore.ieee.org abstract).

Hou, R. Y., and Patt, Y. N., "Comparing Rebuild Algorithms for Mirrored and RAID5 Disk Arrays," Proceedings of the 1993 ACM SIGMOD International Conference on Management of Data and Symposium on Principles of Database Systems, 1993, pp. 317–326 (also submitted is a four–page portal.acm.org abstract).

Wilkes, J., et al., "The HP AutoRAID Hierarchical Storage Systems," ACM Transactions on Computer Systems, vol. 14, No. 1, Feb. 1996, pp. 108–136.

Polyzois, C. A., and Garcia–Molina, H., "Processing of Read–Only Queries at a Remote Backup," Proceedings of the $13^{th}$ Symposium on Reliable Distributed Systems, Oct. 25–27, 1994, Dana Point, CA, IEEE Computer Society Press, Los Alamitos, CA, pp. 192–201.

Schatz, W., "When Data is not Enough," Computerworld Client/Server Journal, Apr. 1, 1995, pp. 25+ (3 pages downloaded from eLibrary.com).

Remote Mirroring Technical White Paper, Copyright 1994–2002 Sun Microsystems, publilshed at least as early as May 17, 2002 at sun.com, 25 pages.

Moad, J., "Will StorageTek's Iceberg Float?", Datamation, Feb. 1, 1992, pp. 59–60.

Koop, P., "Replication at Work. (four companies use Oracle and Sybase replication servers to solve business problems)," DBMS, vol. 8, No. 3, p. 54(4), Mar. 1995.

IBM 3390 Storage Control Reference, No. GA32–009903, Fourth Edition (Dec. 1989), IBM Corporation.

Double Disk Volume Control Program WDCP/ES, First Edition, Oct. 1997, 6190–3–316–10(E), Hitachi Ltd., Japan.

P/DAS and Enhancements to the IBM 3990–6 and RAMAC Array Family, First Edition (May 1996), No. SG24–4724–00, IBM Corporation, San Jose, CA.

Oracle RDMS Database Administator's Guide, vols. 1 and 2, Part No. 6693–70–0292 Feb. 1992, Oracle Corp., Redwood City, CA.

Hitachi, Ltd's and Hitachi, Data Systems Corporation's , Response to the Notice of Investigation and Complaint, Jul. 10, 2002, Investigation No. 337–TA–471, United States International Trade Commission, published at dockets.us-itc.gov.

United States International Trade Commission, Order No. 5 Modifying Protective Order, Investigation No. 337–TA–471, published at dockets,usitc.gov.

Hitachi, Ltd. And Hitachi Data Systems Corporation, Submission of Representative Invalidity Charts, Jul. 26, 2002, Investigation No. 337–TA–471, United States International Trade Commision published at dockets.usitc.gov.

Hitachi, Ltd's and Hitachi Data Systems Corporation's First Amended Response to the Notice of Investigation and Complaint, Aug. 20, 2002, Investigation No. 337–TA–471, United States International Trade Commission, published at dockets.usitc.gov.

Lupo, R. V., letter dated Aug. 21, 2002 and regarding typographical errors and enclosed replacement pages for Hitachi, Ltd's and Hitachi Data Systems Corporation's First Amended Response to the Notice of Investigation and Complaint, Aug. 20, 2002, Investigation No. 337–TA–471, United States International Trade Commission, published at dockets.usitc.gov.

Hitachi, Ltd. And Hitachi Data Systems Corporation, Citations of prior art and other references (5 pages), Investigation No. 337–TA–471, United States International Trade Commission, published at dockets.usitc.gov.

Respondent's Hitachi, Ltd. and Hitachi Data Systems Corporation's Response to the Notice of Invetigation and Complaint, Jul. 10, 2002, Investigation No. 337–TA–471, United States International Trade Commission, published at dockets.usit.gov.

United States of International Trade Commission, Order No. 11 Granting Respondents' Motion to Amend Response and Ordering Submission by Private Parties, Sep. 12, 2002, Investigation No. 337–TA–471, public version published at dockets.usitc.gov.

Complainant EMC Corporation's Submission in Response to Specific Questions Raised in Order No. 12, Sep. 27, 2002, Investigation No. 337–TA–471, United States International Trade Commission, published at dockets.usitc.gov.

United States International Trade Commission, Order No. 20 Denying Hitachi's Motion No. 471–16 To Compel, Oct. 25, 2002, Investigation No. 337–TA–471, public version published at dockets,usitc.gov.

United States International Trade Commission, Order No. 9 Denying Complainant's Motion No. 471–3 To Modify the Protective Order(Order No. 2), Oct. 31, 2002, Investigation No. 337–TA–471, public version publised at dockets.usitc.gov.

United States International Trade Commission, Commission Investigative Staff's Response to Order No. 24, Oct. 31, 2002, Investigation No. 337–TA–471, published at dockets.usitc.gov.

Complainant EMC Corporation's Submission of Responses to Specific Questions Raised in Order No. 24, Oct. 31, 2002, Investigation No. 337–TA–471, United States International Trade Commission, published at dockets,usitc.gov.

United States International Trade Commission, Commission Investigative Staff's Response to Order No. 28, Nov. 8, 2002, Investigation No. 337–TA–471, published at dockets.usitc.gov.

Respondents Hitachi, Ltd and Hitachi Data Corporation's Responses to Order No. 28, Nov. 8, 2002, Investigation No. 337–TA–471, United States International Trade Commission, published at dockets.usitc.

United States International Trade Commission, Notice of Commission Decision Not to Review and Initial Determination Granting Complainant EMC's Motion To Terminate the Investigation as to Certain Claims and to Amend the Complaint and Notice of Investigation by Adding Two Claims, Federal Register, vol. 87, No. 226, Nov. 22, 2002.

United States International Trade Commission, Order No. 32 Granting Respondent's Motion No. 471–25 To File a Second Amended Response to the Complaint and Notice of Investigation, Dec. 4, 2002, Investigation No. 337–TA–471, public version published at dockets,usitc.gov.

United States International Trade Commission, Order No. 44 Requiring Submission From Respondents, Jan. 17, 2003, Investigation No. 337–TA–471, published at dockets.usitc.gov.

United States Internationl Trade Commission, Order No. 45 Requiring Submission From Respondents, Jan. 21, 2003, Investigation No. 337–TA–471, published at dockets.usitc.gov.

* cited by examiner

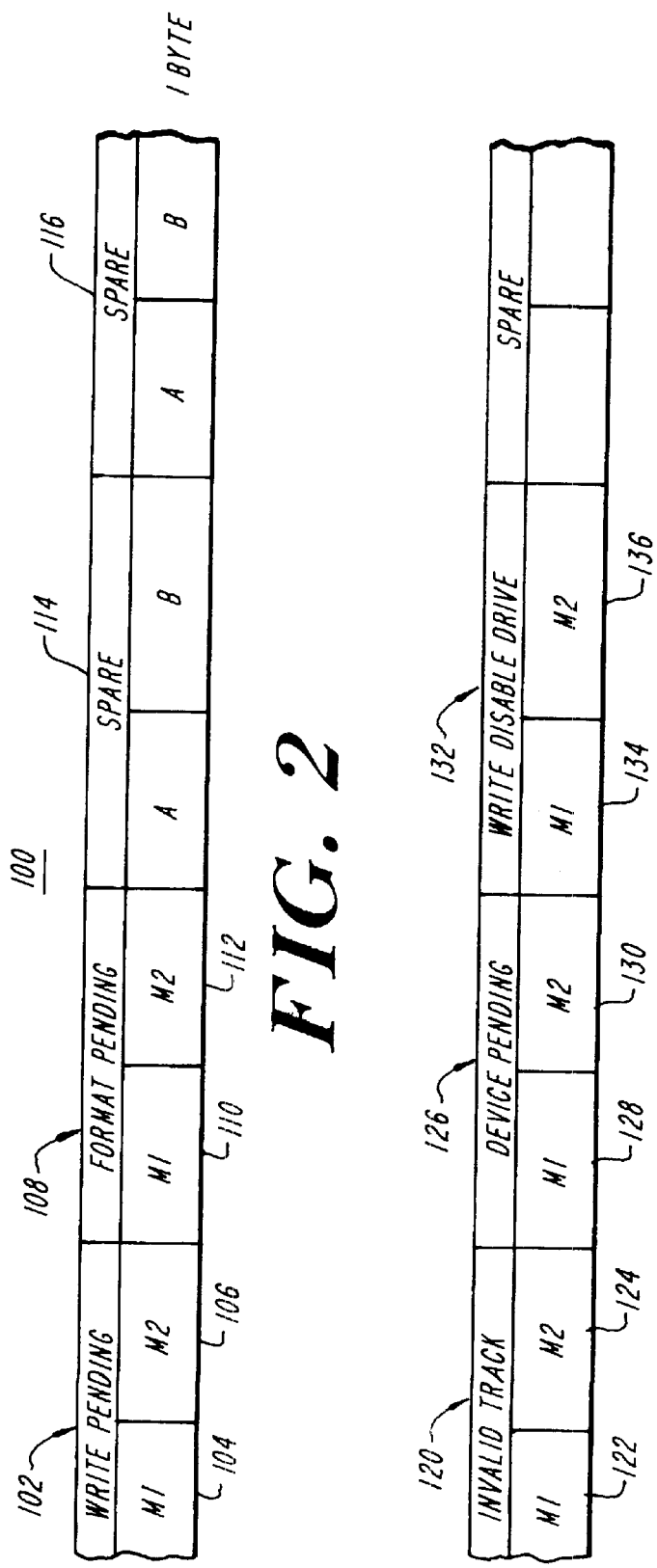

SERVICE PROCESSOR FUNCTIONS

| THE SERVICE PROCESSOR 34 COUPLED TO THE PRIMARY DATA STORAGE SYSTEM CONTROLLER 16 PROVIDES MONITORING, REPAIR, SERVICE, OR STATUS ACCESS TO THE PRIMARY DATA STORAGE SYSTEM CONTROLLER 16. |
|---|
| THE SERVICE PROCESSOR OF THE PRIMARY DATA STORAGE SYSTEM AND THE SERVICE PROCESSOR OF THE SECONDARY DATA STORAGE SYSTEM MAY BE COUPLED TO PROVIDE FOR REMOTE SYSTEM CONFIGURATION, REMOTE SOFTWARE PROGRAMMING, AND TO PROVIDE A HOST BASE POINT OF CONTROL OF THE SECONDARY DATA STORAGE SYSTEM. |
| A LOG FILE OF PENDING DATA WHICH HAS YET TO BE WRITTEN TO THE SECONDARY DATA STORAGE DEVICE MAY BE KEPT ON REMOVABLE, NON-VOLATILE MEDIA IN THE SERVICE PROCESSORS. |
| THE SERVICE PROCESSORS MAY PERIODICALLY SCAN AN INDEX TABLE FOR WRITE PENDING INDICATOR BITS AND INVOKE A COPY TASK WHICH COPIES THE DATA FROM THE PRIMARY DATA STORAGE DEVICE TO THE SECONDARY. |
| THE SERVICE PROCESSOR MAY CONSTANTLY CHECK INVALID TRACK BITS ON EACH DATA STORAGE DEVICE, AND IF A BIT IS FOUND TO BE SET, A COPY TASK IS INVOKED TO COPY THE DATA FROM THE KNOWN GOOD DEVICE TO THE DEVICE WITH THE INVALID TRACK SET. |
| A UTILITY OPERATING ON THE SERVICE PROCESSORS WILL GIVE THE USER A REPORT OF ALL OF THE NON-VALID (OUT OF SYNC) TRACKS. THIS REPORT CAN BE TRANSFERRED FROM ONE SITE TO ANOTHER OVER THE LINK 63, FIG. 1, THAT CONNECTS THE TWO SERVICE PROCESSORS 34, 62. |

*FIG. 4*

REMOTE DATA MIRRORING SYSTEM HAVING A SERVICE PROCESSOR

RELATED APPLICATIONS

This application is a divisional of U.S. patent application Ser. No. 09/709,814 filed Nov. 10, 2000, which is a divisional of U.S. patent application Ser. No. 09/061,708 filed Apr. 17, 1998 (U.S. Pat. No. 6,173,377 issued Jan. 9, 2001), which is a continuation of U.S. patent application Ser. No. 08/654,511 filed May 28, 1996 (U.S. Pat. No. 5,742,792 issued Apr. 21, 1998), which is a continuation-in-part of U.S. patent application Ser. No. 08/052,039 filed Apr. 23, 1993, entitled REMOTE DATA MIRRORING (U.S. Pat. No. 5,544,347 issued Aug. 6, 1996), which are all incorporated herein by reference.

FIELD OF THE INVENTION

This invention relates to data storage, and more particularly, to a system and method for automatically providing and maintaining a copy or mirror of data stored at a location geographically remote from the main or primary data storage device.

BACKGROUND OF THE INVENTION

Nearly all data processing system users are concerned with maintaining back-up data in order to insure continued data processing operations should their data become lost, damaged, or otherwise unavailable.

Large institutional users of data processing systems which maintain large volumes of data such as banks, insurance companies, and stock market traders must and do take tremendous steps to insure back-up data availability in case of a major disaster. These institutions recently have developed a heightened awareness of the importance of data recovery and back-up in view of the many natural disasters and other world events including the bombing of the World Trade Center in New York City.

Currently, data processing system users often maintain copies of their valuable data on site on either removable storage media, or in a secondary "mirrored" storage device located on or within the same physical confines of the main storage device. Should a disaster such as fire, flood, or inaccessibility to a building occur, however, both the primary as well as the secondary or backed-up data will be unavailable to the user. Accordingly, more data processing system users are requiring the remote storage of backup data.

One prior art approach at data back-up involves taking the processor out of service while back-up tapes are made. These tapes are then carried off premises for storage purposes. Should access to the backed-up data be required, the proper tape must be located, loaded onto a tape drive, and restored to the host system requiring access to the data. This process is very time consuming and cost intensive, both in maintaining an accurate catalog of the data stored on each individual tape, as well as storing the large number of tapes required to store the large amounts of data required by these institutions. Additionally and most importantly, it often takes twenty-four hours before a back-up tape reaches its storage destination during which time the back-up data is unavailable to the user.

Additionally, today's systems require a significant amount of planning and testing in order to design a data recovery procedure and assign data recovery responsibilities. Typically, a disaster recovery team must travel to the test site carrying a large number of data tapes. The team then loads the data onto disks, makes the required network connections, and then restores the data to the "test" point of failure so processing can begin. Such testing may take days or even weeks and always involves significant human resources in a disaster recovery center or back-up site.

Some providers of prior art data storage systems have proposed a method of data mirroring whereby one host Central Processing Unit (CPU) or processor writes data to both a primary, as well as a secondary, data storage device or system. Such a proposed method, however, overly burdens the host CPU with the task of writing the data to a secondary storage system and thus dramatically impacts and reduces system performance.

Accordingly, what is required is a data processing system which automatically and asynchronously, with respect to a first host system, generates and maintains a backup or "mirrored" copy of a primary storage device at a location physically remote from the primary storage device, without intervention from the host which seriously degrades the performance of the data transfer link between the primary host computer and the primary storage device.

SUMMARY OF THE INVENTION

This invention features a system which automatically, without intervention from a host computer system, controls storing of primary data received from a primary host computer on a primary data storage system, and additionally controls the copying of the primary data to a secondary data storage system controller which forms part of a secondary data storage system, for providing a back-up copy of the primary data on the secondary data storage system which is located in a geographically remote location from the primary data storage system.

Copying or mirroring of data from a primary data storage system to a secondary data storage system is accomplished without intervention of a primary or secondary host computer and thus, without affecting performance of a primary or secondary host computer system. Primary and secondary data storage system controllers are coupled via at least one high speed communication link such as a fiber optic link driven by LED's or laser.

At least one of the primary and secondary data storage system controllers coordinates the copying of primary data to the secondary data storage system and at least one of the primary and secondary data storage system controllers maintains at least a list of primary data which is to be copied to the secondary data storage device.

Additionally, the secondary data storage system controller provides an indication or acknowledgement to the primary data storage system controller that the primary data to be copied to the secondary data storage system in identical form as secondary data has been received or, in another embodiment, has actually been written to a secondary data storage device.

Accordingly, data may be transferred between the primary and secondary data storage system controllers synchronously, when a primary host computer requests writing of data to a primary data storage device, or asynchronously with the primary host computer requesting the writing of data to the primary data storage system, in which case the remote data copying or mirroring is completely independent of and transparent to the host computer system.

At least one of the primary data storage system controller and the secondary data storage system controller maintains a list of primary data which is to be written to the secondary data storage system. Once the primary data has been at least received or optionally stored on the secondary data storage system, the secondary data storage system controller provides an indication or acknowledgement of receipt or completed write operation to the primary data storage system.

At such time, the primary and/or secondary data storage system controller maintaining the list of primary data to be copied updates this list to reflect that the given primary data has been received by and/or copied to the secondary data storage system. The primary or secondary data storage system controllers and/or the primary and secondary data storage devices may also maintain additional lists for use in concluding which individual storage locations, such as tracks on a disk drive, are invalid on any given data storage device, which data storage locations are pending a format operation, which data storage device is ready to receive data, and whether or not any of the primary or secondary data storage devices are disabled for write operations.

Thus, an autonomous, host computer independent, geographically remote data storage system is maintained providing a system which achieves nearly 100 percent data integrity by assuring that all data is copied to a geographically remote site, and in those cases when a back-up copy is not made due to an error of any sort, an indication is stored that the data has not been copied, but instead must be updated at a future time.

Such a system is provided which is generally lower in cost and requires substantially less manpower and facilities to achieve than the prior art devices.

The present invention more particularly concerns the use of a service processor in at least the primary data storage system. In the preferred implementation, the primary data storage system includes a primary service processor for servicing the primary data storage system controller, and the secondary data storage system includes a secondary service processor for servicing the secondary data storage system controller. The primary and secondary service processors are linked to permit remote system configuration and remote software programming of the secondary data storage system, and to exchange a report of all the non-valid, out of sync tracks. The service processors can also perform the task of scanning for remote write pending bits to invoke the remote copy task, and checking for invalid track bits to invoke a task for copying data from a known good storage device to the device with the invalid track bit set.

BRIEF DESCRIPTION OF THE DRAWINGS

These and other features and advantages of the present invention will be better understood when read together with the following drawings wherein:

FIG. 2 is a schematic representation of a portion of an index or list maintained by the system of the present invention to determine various features including which primary data has been copied to a secondary disk;

FIG. 3 is a schematic representation of an additional list or index maintained by the system of the present invention to keep track of additional items including an invalid data storage device track, device ready status and write disable device status; and FIG. 4 is a table that lists various service processor functions.

DESCRIPTION OF ILLUSTRATIVE EMBODIMENTS

Figure 1:
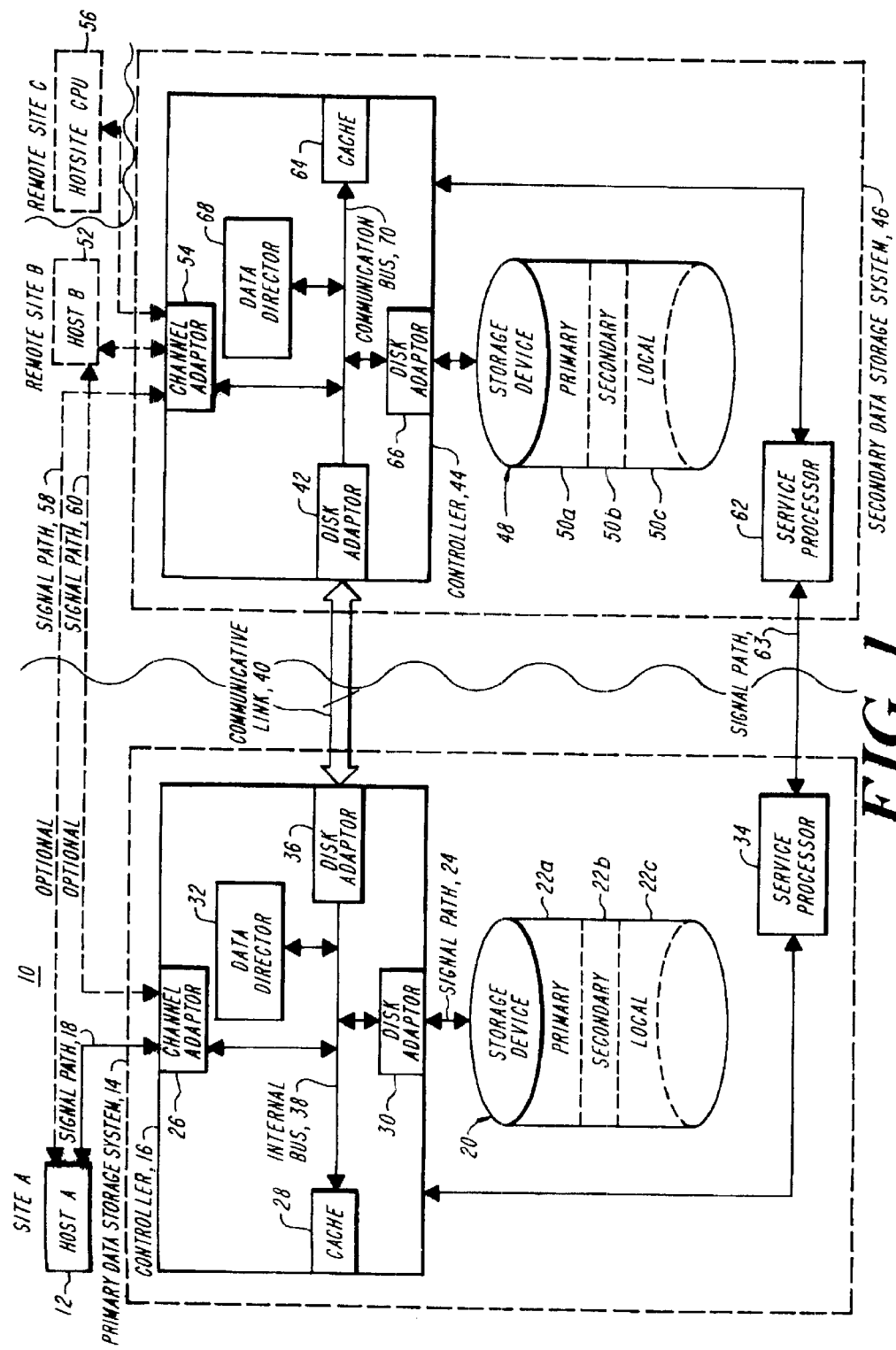
FIG. 1 is a block diagram illustrating the system with remote data mirroring according to the present invention.

The present invention features a system which provides a geographically remote mirrored data storage system which contains generally identical information to that stored on a primary data storage system. Utilizing such a system, data recovery after a disaster is nearly instantaneous and requires little, if any, human intervention. Using the present system, the data is retrieved from a remote device through the host data processing system.

A system in accordance with the present invention is shown generally at 10, FIG. 1, and includes at site A, which is a first geographic location, a host computer system 12 as is well known to those skilled in the art. The host computer system 12 is coupled to a first and primary data storage system 14. The host 12 writes data to and reads data from the primary data storage system 14.

The primary data storage system 14 includes a primary data storage system controller 16 which receives data from the host 12 over data signal path 18. The primary data storage system controller 16 is also coupled to a storage device 20 which may include a plurality of data storage devices 22a–22c. The storage devices may include disk drives, optical disks, CD's or other data storage devices. The primary system controller 16 is coupled to the storage device 20 by means of data signal path 24.

The primary data storage system controller 16 includes at least one channel adapter (C.A.) 26 which is well known to those skilled in the art and interfaces with host processing system 12. Data received from the host is typically stored in cache 28 before being transferred through disk adapter (D.A.) 30 over data signal path 24 to the primary storage device 20. The primary data storage controller 16 also includes a data director 32 which executes one or more sets of predetermined micro-code to control data transfer between the host 12, cache memory 28, and the storage device 20. Although the data director 32 is shown as a separate unit, either one of a channel adapter 26 or disk adapter 30 may be operative as a data director, to control the operation of a given data storage system controller. Such a reconfigurable channel adapter and disk adapter is disclosed in Applicant's U.S. Pat. No. 5,335,352 entitled RECONFIGURABLE, MULTIFUNCTION DATA STORAGE SYSTEM CONTROLLER SELECTIVELY OPERABLE AS AN INPUT CHANNEL ADAPTER AND A DATA STORAGE UNIT ADAPTER, which is fully incorporated herein by reference.

The primary data storage system 14 according to one embodiment of the present invention also includes a service processor 34 coupled to the primary data storage system controller 16, and which provides additional features such as monitoring, repair, service, or status access to the storage system controller 16.

The primary data storage system controller 16 of the present invention also features at least a second disk adapter 36 coupled to the internal bus 38 of the primary data storage system controller 16. The second disk adapter 36 is coupled, via a high speed communication link 40 to a disk adapter 42 on a secondary data storage system controller 44 of a secondary data storage system 46. Such high speed, point-to-point communication links between the primary and secondary data storage system controllers 16 and 44 include a fiber optic link driven by an LED driver, per IBM ESCON standard; a fiber optic link driven by a laser driver, and optionally T1 and T3 telecommunication links. Utilizing network connections, the primary and secondary data storage system controllers 16 and 44 may be connected to FDDI networks, T1 or T3 based networks and SONET networks.

The secondary data storage system 46 is located at a second site geographically removed from the first site. For this patent application, "geographically removed site" means not within the same building as the primary data storage system. There are presently known data processing systems which provide data mirroring to physically different data storage systems. The systems, however, are generally within the same building. The present invention is directed to providing complete data recovery in case of disaster, such as when a natural disaster such as a flood or a hurricane, or man-made disasters such as fires or bombings destroy one physical location, such as one building.

As in the case of the primary data storage system, the secondary data storage system 46 includes, in addition to the secondary data storage system controller 44, a secondary data storage device 48 including a plurality of storage devices 50a—50c. The plurality of storage devices on the secondary data storage system 46, as well as the primary data storage system 14, may have various volumes and usages such as a primary data storage device 50a which is primary with respect to the attached storage controller 44 and host 52 in the case of the secondary data storage system 46, and the primary storage device 22a which is primary with respect to the first or primary host 12 in the case of the primary data storage system 14.

Additionally, each storage device, such as storage device 48, may include a secondary storage volume 50b which serves as the secondary storage for the primary data stored on the primary volume 22a of the primary data storage system 14. Similarly, the primary data storage system 14 may include a secondary storage volume 22b which stores primary data received and copied from the secondary site and data storage system 46 and host 52.

Additionally, each storage device 20, 48, may include one or more local volumes or storage devices 22c, 50c, which are accessed only by their locally connected data processing systems.

The secondary storage system controller 44 also includes at least a first channel adapter 54 which may receive data from an optionally connected secondary host 52 or an optionally connected hotsite host or CPU 56. Optionally, the primary host 12 may include a data signal path 58 directly into the channel adapter 54 of the secondary data storage system 46, while the optional secondary host 52 may include an optional data path 60 into the channel adapter 26 of the primary data storage system 14. Although the secondary host 52 illustrated in FIG. 1 is not required for remote data mirroring as described in the present patent application, such a host would be required for data retrieval if both the primary host 12 as well as the primary data storage system 14 would be rendered inoperative. Similarly, a hotsite host or CPU 56 may optionally be provided at a third geographically remote site to access the data stored in the secondary data storage system 46.

The high speed link 40 between the primary and secondary data storage systems 14 and 46 is designed such that multiple links between the primary and secondary storage system may be maintained for enhanced availability of data and increased system performance. The number of links is variable and may be field upgradeable. Additionally, the service processor 34 of the primary data storage system 14 and the service processor 62 of the secondary data storage system 46 may also be coupled to provide for remote system configuration, remote software programming, and to provide a host base point of control of the secondary data storage system.

The secondary data storage system controller 44 also includes cache memory 64 which receives data from channel adapter 54 and disk adapter 42, as well as disk adapter 66 which controls writing data to and from secondary storage device 48. Also provided is a data director 68 which controls data transfer over communication bus 70 to which all the elements of the secondary data storage system controller are coupled.

An additional feature of the system 10 of FIG. 1 is the ability to dynamically reconfigure channel adapters as disk adapters and disk adapters as channel adapters, as described in Applicant's U.S. Pat. No. 5,269,011 entitled DYNAMICALLY RECONFIGURABLE DATA STORAGE SYSTEM WITH STORAGE SYSTEM CONTROLLERS SELECTIVELY OPERABLE AS CHANNEL ADAPTERS OR STORAGE DEVICE ADAPTERS, which is fully incorporated herein by reference.

The primary and secondary data storage systems may optionally be connected by means of currently available, off-the-shelf channel extender equipment using bus and tag or ESCON interfaces.

The data storage system 10 of FIG. 1 is designed to provide the copying of data from a primary data storage system to a physically remote secondary data storage system transparent to the user, and external from any influence of the primary host which is coupled to the primary data storage system. The system 10 of FIG. 1 is designed to operate in at least two modes, the first being a real-time or synchronous mode wherein the primary and secondary storage systems must guarantee that the data exists and is stored in two physically separate data storage units before input/output completion; that is, before channel end and device end is returned to the primary host. Alternatively, the system 10 of FIG. 1 is designed to operate in a point-in-time or asynchronous mode wherein the data is copied to the remote or secondary data storage system asynchronously from the time when the primary or local data processing system returns the input/output completion signal (channel end and device end) to the primary host. This eliminates any performance penalty if the communication link between the primary and secondary data storage systems is too slow, but creates the additional needs to manage the situation where data is not identical or in "sync" between the primary and secondary data storage systems.

Thus, in the real time or synchronous mode, the primary data storage system automatically controls the duplication or copying of data to the secondary data storage system controller transparently to the primary host computer. Only after data is safely stored in both the primary and secondary data storage system, as detected by an acknowledgement from the secondary storage system to the primary storage system, does the primary data storage system acknowledge to the primary host computer that the data is synchronized. Should a disaster or facility outage occur at the primary data storage system site, the user will simply need to initialize the application program in the secondary data storage system utilizing a local host (52) or a commercial hotsite CPU or host 56.

The link between the primary and secondary storage system controllers 14 and 46 may be maintained in a unidirectional mode wherein the primary data storage system controller monitors and controls data copying or mirroring. Alternatively, a bi-directional implementation may be used wherein either controller can duplicate data to the other controller, transparently to the host computer. Should a disaster or facilities outage occur, recovery can be automatic with no human intervention since the operational host computer already has an active path (40, 58, 60) to the data through its local controller. While offering uninterrupted recovery, performance will be slower than in an unidirectional implementation due to the overhead required to manage intercontroller tasks.

In the second, point-in-time mode of operation, the primary data storage system transparently duplicates data to the secondary data storage system after the primary data storage system acknowledges to the host computer, via channel end and device end, that the data has been written to the storage device and the input/output operation has been completed. This eliminates the performance impact of data mirroring over long distances. Since primary and secondary data are not synchronized, however, the primary data storage system must maintain a log file of pending data which has yet to be written to the secondary data storage device. Such data may be kept on removable, non-volatile media, in the cache memory of the primary or secondary data storage system controller as will be explained below, or in the service processor 34, 62.

Accordingly, a feature of the system 10 of FIG. 1 is the ability of a data storage system to control the transfer or copying of data from a primary data storage system to the secondary data storage system, independent of and without intervention from one or more host computers. Most importantly, in order to achieve optimum data mirroring performance, such data mirroring or copying should be performed asynchronously with input/output requests from a host computer. Accordingly, since data will not be immediately synchronized between the primary and secondary data storage systems, data integrity must be maintained by maintaining an index or list of various criteria including a list of data which has not been mirrored or copied, data storage locations for which a reformat operation is pending, a list of invalid data storage device locations or tracks, whether a given device is ready, or whether a device is write-disabled. Information must also be included as to the time of the last operation so that the data may later be synchronized should an error be detected.

A feature of the system 10 of FIG. 1 is that both the primary or secondary data storage systems maintain a table of the validity of data in the other storage system. As disclosed in U.S. Pat. No. 5,206,939 entitled SYSTEM AND METHOD FOR DISK MAPPING AND DATA RETRIEVAL, which is fully incorporated herein by reference, the present system maintains a list or index, utilizing one or more flag bits, in a hierarchical structure, on each physical and logical data storage device.

In the system 10 of FIG. 1, however, such information is kept on both devices for each individual system as well as the other data storage system. Thus, as illustrated in FIG. 2 in the partial list or table 100, each data storage system maintains an indication of write or copy pending 102 of both the primary data (M1) 104, and the secondary data (M2) 106. Similarly, an index is maintained of a pending format change since a disk format change may be accomplished. The format pending bits 108 including a first primary bit 110 and a second secondary bit 112 indicate that a format change has been requested and such change must be made on the disk.

Thus, when a host computer writes data to a primary data storage system, it sets both the primary and secondary bits 104, 106 of the write pending bits 102 when data is written to cache. For these examples, the M1 bit will refer to the primary data storage system and the M2 bit will refer to the secondary data storage system. When the primary data storage system controller's disk adapter writes the data to the primary data storage device, it will reset bit 104 of the write pending indicator bits 102. Similarly, once the secondary data storage system has written the data to the secondary data storage device, the secondary data storage write pending indicator bit 106 will be reset.

The service processors in one embodiment of the present invention will periodically scan the index table for write pending indicator bits and invoke a copy task which copies the data from the primary data storage device to the secondary. In addition, one or more of the spare index or table bits 114, 116 may be utilized to store other data such as time stamp, etc.

In addition to the write pending and format pending bits described above, the system 10 also includes several additional general purpose flags to assist in error recovery. As shown in FIG. 3, invalid track flags 120 including primary bit 122 and secondary bit 124 are utilized and maintained on each data storage device to indicate that the data storage location such as a track, does not contain valid data. Another background task running on the data storage system such as in the service processor constantly checks invalid track bits on each data storage device, and if a bit is found to be set, the copy task is invoked to copy the data from the known good device to the device with the invalid flag track set. Additional flags may be provided such as the device ready flags 126 including bits 128 and 130 which serve to indicate that the device is ready. Similarly, write disable flags 132 may be provided which indicate that a particular primary device or drive 134 or secondary device or drive 136 can presently not be written to. Data can still be copied to the good or enabled drive and then later copied to the disabled drive. If one drive or device is bad, the system 10 of FIG. 1 will set all tracks of that drive as not valid to later cause a copy of all the data.

Accordingly, each data storage device keeps data validity information about its mirrored device. If for some reason a device is not accessible, either the primary or the secondary device, every new write command goes to the accessible mirrored device along with information that the not accessible device has a track which is not valid. As soon as the non-accessible device becomes accessible, then automatically, as a background operation, the drives re-synchronize. In the case when a specific track is not shown on both the primary and secondary storage system, an indication of such will be assigned and the user will be alerted. A utility operating on the service processors will give the user a report of all the non-valid (out of sync) tracks. This report can be transferred from one site to another over the link 63, FIG. 1, that connects the two service processors 34, 62.

FIG. 4 shows a listing of the various service processor functions that have been described above. The service processor 34 coupled to the primary data storage system controller 16 provides monitoring, repair, service, or status access to the primary data storage system controller 16. The service processor of the primary data storage system and the service processor of the secondary data storage system may be coupled to provide for remote system configuration, remote software programming, and to provide a host base point of control of the secondary data storage system. A log file of pending data which has yet to be written to the secondary data storage device may be kept on removable, non-volatile media in the service processors. The service processors may periodically scan an index table for write pending indicator bits and invoke a copy task which copies the data from the primary data storage device to the secondary. The service processor may constantly check invalid track bits on each data storage device, and if a bit is found to be set, a copy task is invoked to copy the data from the known good device to the device with the invalid track set. A utility operating on the service processors will give the user a report of all of the non-valid (out of sync) tracks. This report can be transferred from one site to another over the link 63, FIG. 1, that connects the two service processors 34, 62.

Modifications and substitutions by one of ordinary skill in the art are considered to be within the scope of the present invention, which is not to be limited except by the claims which follow.

What is claimed is:

1. A remote data mirroring system for storing data from a host computer into primary data storage, and automatically, without intervention from the host computer, copying the data into secondary storage geographically remote from the primary data storage, said remote data mirroring system comprising:

a primary data storage system including at least one primary data storage device providing the primary data storage, the primary data storage system also including a primary cache memory and at least one primary data storage system controller coupled to the primary cache memory and the primary data storage device for controlling the storing of the data from the host computer into the primary data storage; and a secondary data storage system geographically removed from the primary data storage system, the secondary data storage system being coupled to the primary data storage system by a communication link for transmission of the data from the primary data storage system to the secondary data storage system, the secondary data storage system including at least one secondary data storage device providing the secondary data storage, the secondary data storage system also including a secondary cache memory and at least one secondary data storage system controller coupled to the secondary cache memory and the secondary data storage device for controlling the storage of the data from the primary data storage system into the secondary data storage;

wherein the primary data storage system is responsive to a command from the host computer to write data by initially storing the data on the primary cache memory, and subsequently transferring the data from the primary cache memory to the primary data storage device and also across the communications link to the secondary data storage system for storage in the secondary data storage device;

wherein the primary data storage system includes a primary service processor coupled to the primary data storage system controller for servicing of the primary data storage system controller, the secondary data storage system includes a secondary service processor coupled to the secondary data storage system controller for servicing of the secondary data storage system controller, and the primary service processor is coupled to the secondary service processor for transfer of service information.

2. The remote data mirroring system of claim 1, which includes a signal path coupling the primary service processor to the secondary service processor for the transfer of the service information, the signal path being independent of the communications link coupling the secondary data storage system to the primary data storage system for transmission of the data from the primary data storage system to the secondary data storage system.

3. The remote data mirroring system of claim 1, wherein the primary service processor provides at least one of repair, service, or status access to the primary data storage system controller.

4. The remote data mirroring system of claim 1, wherein the secondary service processor is coupled to the primary service processor for remote system configuration of the secondary data storage system.

5. The remote data mirroring system of claim 1, wherein the wherein the secondary service processor is coupled to the primary service processor in order for the primary service processor to provide remote software programming of the secondary data storage system.

6. The remote data mirroring system of claim 1, wherein the secondary service processor is coupled to the primary service processor in order for the primary service processor to provide a host base point of control of the secondary data storage system.

7. The remote data mirroring system of claim 1, wherein at least one of the service processors scans an index for write pending indicators and invokes a copy task which copies write-pending data from the primary data storage system to the secondary data storage system.

8. The remote data mirroring system of claim 1, wherein at least one of the service processors checks invalid track indicators on each data storage device, and if an invalid track indicator is found to indicate an invalid track, a copy task is invoked to copy the data from the known good data storage device to the data storage device with the invalid track indicator indicating an invalid track.

9. The remote data mirroring system as claimed in claim 1, wherein at least one of the service processors provides a report of all non-valid, out of sync tracks.

10. The remote data mirroring system as claimed in claim 1, wherein as soon as a non-accessible data storage device becomes accessible, then automatically, as a background operation, the remote data mirroring system re-synchronizes the data storage devices.

11. The remote data mirroring system of claim 1, wherein the service information transferred between the primary service processor and the secondary service processor includes a report of non-valid, out of sync tracks.

12. The remote data mirroring system as claimed in claim 1, wherein the primary service processor stores a log file of pending data which has yet to be written to the secondary data storage device.

13. A remote data mirroring system for storing data from a host computer into primary data storage, and automatically, without intervention from the host computer, copying the data into secondary storage geographically remote from the primary data storage, said remote data mirroring system comprising:

a primary data storage system including at least one primary data storage device providing the primary data storage, the primary data storage system also including a primary cache memory and at least one primary data storage system controller coupled to the primary cache memory and the primary data storage device for controlling the storing of the data from the host computer into the primary data storage; and a secondary data storage system geographically removed from the primary data storage system, the secondary data storage system being coupled to the primary data storage system by a communication link for transmission of the data from the primary data storage system to the secondary data storage system, the secondary data storage system including at least one secondary data storage device providing the secondary data storage, the secondary data storage system also including a secondary cache memory and at least one secondary data storage system controller coupled to the secondary cache memory and the secondary data storage device for controlling the storage of the data from the primary data storage system into the secondary data storage;

wherein the primary data storage system is responsive to a command from the host computer to write data by initially storing the data on the primary cache memory, and subsequently transferring the data from the primary cache memory to the primary data storage device and also across the communications link to the secondary data storage system for storage in the secondary data storage device;

wherein the primary data storage system includes a primary service processor coupled to the primary data storage system controller for servicing of the primary data storage system controller, the secondary data storage system includes a secondary service processor coupled to the secondary data storage system controller for servicing of the secondary data storage system controller, and at least the primary service processor participates in the production or maintenance of the copy of the data in the secondary data storage.

14. The remote data mirroring system of claim 13, wherein the primary service processor is coupled to the secondary service processor for transfer of service information.

15. The remote data mirroring system of claim 14, which includes a signal path coupling the primary service processor to the secondary service processor for transfer of the service information, the signal path being independent of the communications link coupling the secondary data storage system to the primary data storage system for transmission of the data from the primary data storage system to the secondary data storage system.

16. The remote data mirroring system of claim 13, wherein the primary service processor provides at least one of repair, service, or status access to the primary data storage system controller.

17. The remote data mirroring system of claim 13, wherein the secondary service processor is coupled to the primary service processor for remote system configuration of the secondary data storage system.

18. The remote data mirroring system of claim 13, wherein the secondary service processor is coupled to the primary service processor in order for the primary service processor to provide remote software programming of the secondary data storage system.

19. The remote data mirroring system of claim 13, wherein the secondary service processor is coupled to the primary service processor in order for the primary data storage system to provide a host base point of control of the secondary data storage system.

20. The remote data mirroring system of claim 13, wherein at least one of the service processors scans an index for write pending indicators and invokes a copy task which copies write-pending data from the primary data storage system to the secondary data storage system.

21. The remote data mirroring system of claim 13, wherein at least one of the service processors checks invalid track indicators on each data storage device, and if an invalid track indicator is found to indicate an invalid track, a copy task is invoked to copy the data from the known good data storage device to the data storage device with the invalid track indicator indicating an invalid track.

22. The remote data mirroring system as claimed in claim 13, wherein at least one of the service processors provides a report of all non-valid, out of sync tracks.

23. The remote data mirroring system as claimed in claim 13, wherein as soon as a non-accessible data storage device becomes accessible, then automatically, as a background operation, the remote data mirroring system re-synchronizes the data storage devices.

24. The remote data mirroring system of claim 13, wherein the primary service processor is coupled to the secondary service processor for transfer of a report of non-valid, out of sync tracks.

25. The remote data mirroring system as claimed in claim 13, wherein the primary service processor stores a log file of pending data which has yet to be written to the secondary data storage device.

26. A remote data mirroring system for storing data from a host computer into primary data storage, and automatically, without intervention from the host computer, copying the data into secondary storage geographically remote from the primary data storage, said remote data mirroring system comprising:

a primary data storage system including at least one primary data storage device providing the primary data storage, the primary data storage system also including a primary cache memory and at least one primary data storage system controller coupled to the primary cache memory and the primary data storage device for controlling the storing of the data from the host computer into the primary data storage; and a secondary data storage system geographically removed from the primary data storage system, the secondary data storage system being coupled to the primary data storage system by a communication link for transmission of the data from the primary data storage system to the secondary data storage system, the secondary data storage system including at least one secondary data storage device providing the secondary data storage, the secondary data storage system also including a secondary cache memory and at least one secondary data storage system controller coupled to the secondary cache memory and the secondary data storage device for controlling the storage of the data from the primary data storage system into the secondary data storage;

wherein the primary data storage system is responsive to a command from the host computer to write data by initially storing the data on the primary cache memory, and subsequently transferring the data from the primary cache memory to the primary data storage device and also across the communications link to the secondary data storage system for storage in the secondary data storage device;

wherein the primary data storage system includes a primary service processor coupled to the primary data storage system controller for servicing of the primary data storage system controller, the secondary data storage system includes a secondary service processor coupled to the secondary data storage system controller for servicing of the secondary data storage system controller, and the primary service processor is coupled to the secondary service processor for at least one of remote system configuration, remote software programming, or a host base point of control for the secondary data storage system.

27. The remote data mirroring system of claim 26, which includes a signal path coupling the primary service processor to the secondary service processor for transfer of service information, the signal path being independent of the communications link coupling the secondary data storage system to the primary data storage system for transmission of the data from the primary data storage system to the secondary data storage system.

28. The remote data mirroring system of claim 26, wherein the primary service processor provides at least one of repair, service, or status access to the primary data storage system controller.

29. The remote data mirroring system of claim 26, wherein at least the primary service processor participates in the production or maintenance of the copy of the data in the secondary data storage.

30. The remote data mirroring system as claimed in claim 26, wherein at least one of the service processors provides a report of all non-valid, out of sync tracks.

31. A remote data mirroring system for storing data from a host computer into primary data storage, and automatically, without intervention from the host computer, copying the data into secondary storage geographically remote from the primary storage, said remote data mirroring system comprising:

a primary data storage system including at least one primary data storage device providing the primary data storage, the primary data storage system also including a primary cache memory and at least one primary data storage system controller coupled to the primary cache memory and the primary data storage device for controlling the storing of the data from the host computer into the primary data storage; and a secondary data storage system geographically removed from the primary data storage system, the secondary data storage system being coupled to the primary data storage system by a communication link for transmission of the data from the primary data storage system to the secondary data storage system, the secondary data storage system including at least one secondary data storage device providing the secondary data storage, the secondary data storage system also including a secondary cache memory and at least one secondary data storage system controller coupled to the secondary cache memory and the secondary data storage device for controlling the storage of the data from the primary data storage system into the secondary data storage;

wherein the primary data storage system controller is responsive to a command from the host computer to write data by initially storing the data on the primary cache memory and providing an indicator that the data is write pending to each of the primary data storage and the secondary data storage, and in a background task, transferring write-pending data from the primary cache memory to the primary data storage device; and wherein the secondary data storage system controller is responsive to receipt of the data transmitted over the communications link from the primary data storage system by initially storing the data on the secondary cache memory and providing an indicator that the data is write pending to the secondary data storage, and in a background task, transferring the write-pending data from the secondary cache memory to the secondary data storage device; and wherein the primary data storage system includes a primary service processor coupled to the primary data storage system controller for providing repair, service, and status access to the primary data storage system controller, and the secondary data storage system includes a secondary service processor coupled to the secondary data storage system controller for servicing of the secondary data storage system controller, and the secondary service processor is linked to the primary service processor by a signal path for remote system configuration, remote software programming, and a host base point of control for the secondary data storage system.

32. The remote data mirroring system of claim 31, which includes a signal path coupling the primary service processor to the secondary service processor for transfer of service information, the signal path being independent of the communications link coupling the secondary data storage system to the primary data storage system for transmission of the data from the primary data storage system to the secondary data storage system.

33. The remote data mirroring system of claim 31, wherein at least one of the service processors periodically scans for write pending indicators indicating that a copy is pending from the primary data storage system to the secondary data storage system and invokes a copy task which copies write-pending data from the primary data storage system to the secondary data storage system.

34. The remote data mirroring system of claim 31, wherein at least one of the service processors checks for invalid track indicators on each data storage device, and if an invalid track indicator is found to indicate an invalid track, a copy task is invoked to copy the data from the known good data storage device to the data storage device with the invalid track indicator indicating an invalid track.

35. The remote data mirroring system as claimed in claim 31, wherein at least one of the service processors provides a report of all non-valid, out of sync tracks.

* * * * *